Patented Dec. 7, 1948

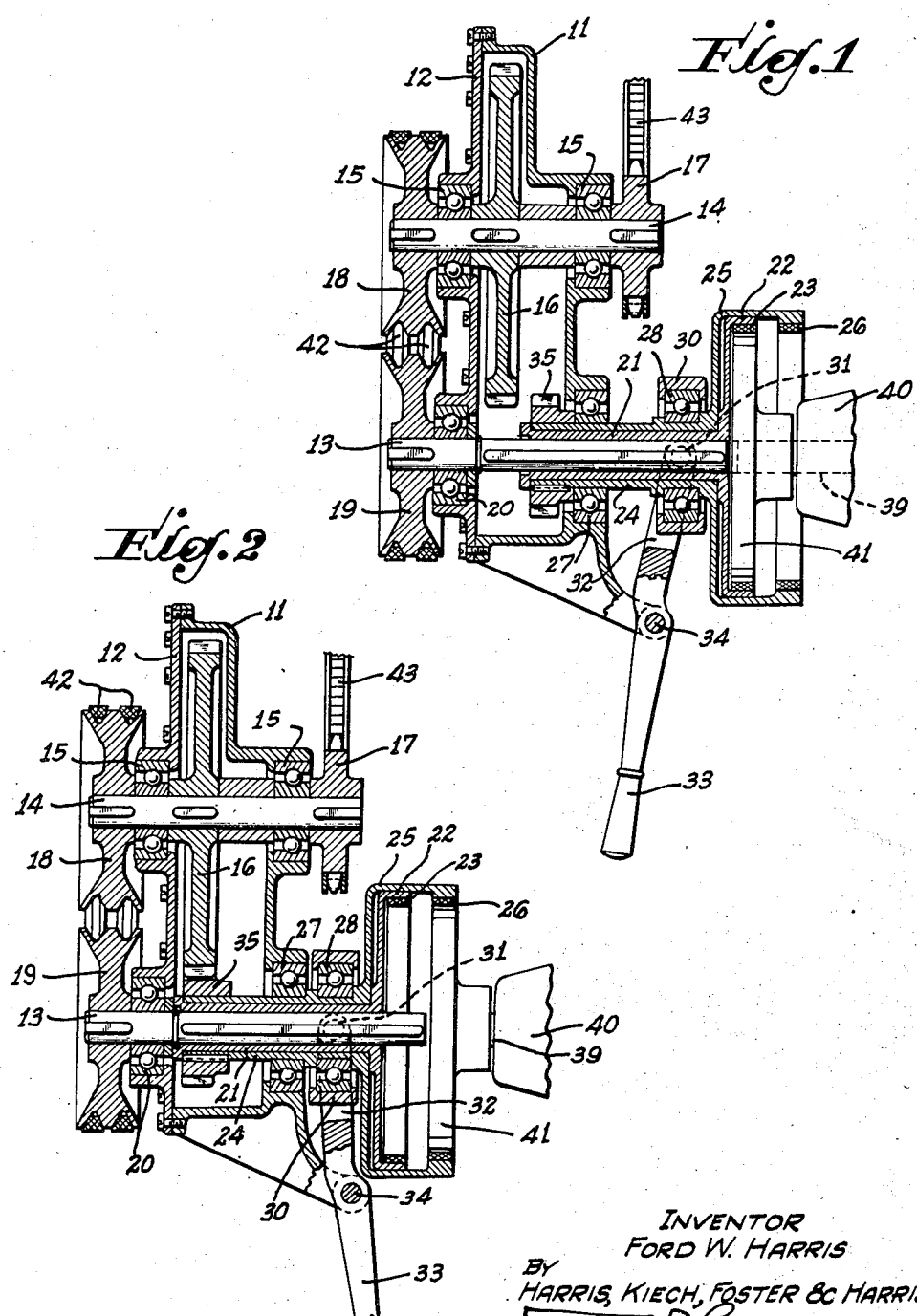

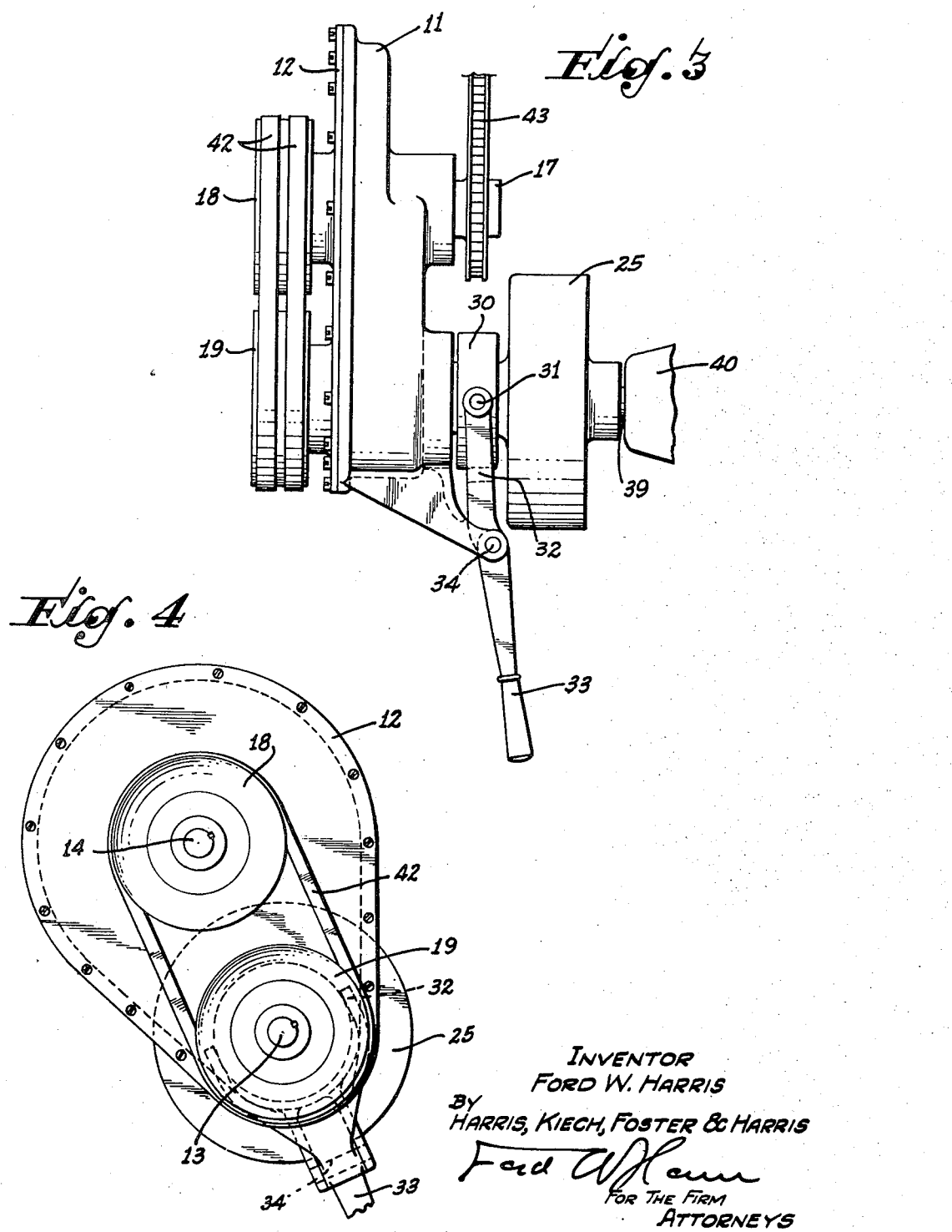

2,455,481

UNITED STATES PATENT OFFICE 2,455,481

REVERSE GEAR

Ford W. Harris, Los Angeles, Calif., assignor, by mesne assignments, to The Calpat Corporation, Los Angeles, Calif., a corporation of California Application December 26, 1944, Serial No. 569,674

6 Claims. (Cl. 74—355)

My invention relates to a reverse gear, that is to say, a gear which may be used betwen a source of power, such as an engine or motor, and a load which is driven by the engine, the reverse gear being so constructed that with the motor running in a forward direction the load can be rotated in either a forward or a reverse direction. The gear is well suited to the driving of light vehicles and will be described as so applied, although it is capable of other uses.

The principal object is to provide a small and relatively cheap reverse gear which can be operated on motors of small horsepower, such as are used in very light vehicles.

It is a further object of the invention to provide a gear of this type which is not only simple in construction and operation, but which is so constructed that it is very sure in operation.

Further objects and advantages will be made evident hereinafter.

Referring to the drawings, which are for illustrative purposes only,

Fig. 1 is a horizontal section through the device with the parts in the position they occupy when the motor is driving the vehicle in a forward direction;

Fig. 2 is a similar section with the parts in the position they occupy when the motor is driving the vehicle in a reverse direction;

Fig. 3 is a plan view; and

Fig. 4 is a side view.

In the drawings, which illustrate only a preferred form of my invention, I provide a main casing 11 having a cover 12 which is secured to the casing 11 in such a manner as to provide an enclosure which is oil-tight. A primary shaft 13 and a secondary shaft 14 are provided, these shafts being substantially parallel to each other and free to turn with relation to the casing 11. The secondary shaft 14 is mounted in ball bearings 15 carried in the main casing 11 and cover 12, and carries a driven gear 16 which is keyed to the shaft. The shaft 14 also carries a sprocket 17, which is also keyed to the shaft, and carries a driven sheave 18 also secured to the shaft 14. The primary shaft 13 carries a driving sheave 19 which is keyed to the shaft 13, this shaft being carried adjacent the driving sheave 19 in ball bearings 20. A primary sleeve 21 is free to move axially on the shaft 13, but is keyed thereto so that it rotates at all times with the shaft. This primary sleeve 21 carries a forward drum 22 inside which a friction lining 23 is secured. This friction lining 23 may be of standard brake-lining material, leather, or the like. Mounted to slide with the primary sleeve 21, but restrained from moving axially on the sleeve, is a secondary sleeve 24, the secondary sleeve 24 carrying a reverse drum 25 on one end thereof, this drum having a friction lining 26. The secondary sleeve 24 rotates in a ball bearing 27 carried in the main casing 11. The primary sleeve 21 may rotate inside the secondary sleeve 24, and the shaft 13 rotates with the primary sleeve 21 so that the ball bearing 27 serves as an alignment means for keeping the parts in proper relationship and supporting them during rotation. Mounted on the secondary sleeve 24 through a ball bearing 28 is a control ring 30. The control ring 30, due to the ball bearing 28, does not rotate and is provided with two pins 31 engaged by a forked lever 32 having a handle 33 and pivoted on a pivot 34. The control ring 30 is so mounted on the secondary sleeve 24 that this sleeve may be pushed from the forward operating position, as shown in Fig. 1, to the reverse position, as shown in Fig. 2. Keyed to the secondary sleeve 24 is a pinion 35, this pinion meshing with and driving the gear 16 with the parts in the reverse position, as shown in Fig. 2.

Mounted on a shaft 39 of a motor 40 is a centrifugal clutch 41 of any well known form, for example, of the form shown in my Patent No. 2,275,046, issued March 3, 1942. The clutch 41 should be of such form that it is expanded by centrifugal force, being held in the retracted position by springs until the shaft 39 of the motor 40 rotates above a critical speed. Above this critical speed, the clutch expands. This clutch may expand to engage the friction lining 23, as shown in Fig. 2, or the friction lining 26, as shown in Fig. 1.

The method of operation, when driving a vehicle in a forward direction, with the parts as shown in Fig. 1, is as follows. As long as the motor 40 is not in operation, that is to say, the shaft 39 is not rotating, the clutch is in retracted position, and the vehicle is not actuated. As soon as the shaft 39 rotates above a predetermined speed, the clutch 41 expands and engages the friction lining 23 on the drum 22. This drives the drum 22, which drives the primary sleeve 21, which is keyed to the shaft 13, which is also driven. The shaft 13 drives the driving sheave 19, and this sheave is connected to the driven sheave 18 by one or more V-belts 42, as shown in Fig. 3. The sheave 18 rotates the shaft 14 in what may be termed a forward direction, which rotates the sprocket 17 and drives the vehicle through a chain 43, as shown in Fig. 3. This causes the vehicle to move forwardly, and as long as it moves forwardly and the clutch 41 is engaged it is practically impossible to move the sleeves 21 and 24 from the positions shown in Fig. 1. The gear 16 rotates freely, not being in mesh with the pinion 35. To shift into reverse gear so that the vehicle will be driven in reverse direction, it is necessary to slow the motor down to a point where the clutch 41 will disengage. When the clutch 41 is so disengaged, it is possible by moving the handle 33 from left to right, as seen in Fig. 3, to shift the two sleeves into the positions shown in Fig. 2. If the motor is now speeded up, the vehicle will be driven in the reverse direction. With the parts as shown in Fig. 2, the clutch, when it expands, engages the friction lining 26 on the drum 25. This drum drives the secondary sleeve 24 and the pinion 35. The pinion 35 is then in mesh with the gear 16, and the shaft 14 is driven in the reverse direction from which it was driven with the parts as shown in Fig. 1. The sprocket 17 then drives the vehicle in reverse direction through the chain 43. When the vehicle is moving in reverse direction, the shaft 13 is rotated in a reverse direction, the shaft 13 and the primary sleeve 21 turning freely inside the secondary sleeve 24.

In any interpretation of the appended claims, the following definitions shall be applied:

The word "clutch" refers to a mechanism which has a primary friction surface which, when the clutching mechanism is expanded, engages a secondary friction surface and drives the member carrying the secondary surface. Such a clutch is shown in Patent No. 2,275,046, patented March 3, 1942, but clutches which operate as above described are well known in the art and form no part of my invention. The word "clutch" as used herein refers to the clutching member which carries the primary friction surface, and does not include the member, usually a drum like the drums 22 and 25, which carries the secondary friction surface.

In claims 9 and 10 the elements forming parts of the combinations claimed therein are the following parts or their mechanical equivalents: The "shaft" is the shaft 14. The forward driven element may be the drum 22 and its connected parts, such as the lining 23 and the shaft 13. The means by which the forward driven element drives the shaft 14 in a forward direction comprises the pulleys 18 and 19 and the belts 42. The reverse driven element comprises the outer drum 25, the lining 26, and the sleeve 24. The means by which the reverse driven element drives the shaft 14 in a reverse direction comprises the gears 35 and 16. The centrifugally actuated driving element is the clutch 41, as above described, and the means for changing the relative positions of said driving element and driven elements comprises the lever 33 and those parts, including the ball bearing 28, which connect the lever to the other elements.

The driving shaft is the primary shaft 13. The internal combustion engine is the motor 40. The forward surface is the inner surface of the friction lining 23 of the drum 22. The reverse surface is the inner surface of the friction lining 26 of the reverse drum 25. The means for causing the clutch to engage either surface is the lever 33 and its connected parts, as above described. The means by which the forward drum 22 drives the driven shaft 14 comprises the pulleys 18 and 19 and the belts 42, and the means by which the reverse drum 25 drives the shaft 14 comprises the gears 35 and 16.

I claim as my invention:

1. In a power transmission used to transmit the power of an internal combustion engine to a driven shaft and so constructed that the driven shaft may be rotated in either a forward or reverse direction without a reversal of the direction of rotation of the engine shaft, the combination of: a centrifugal clutch driven by the engine and adapted to be expanded whenever said engine rotates at a speed above a critical value; a forward drum having a forward surface adapted to be engaged by said clutch when said clutch is so expanded, said forward surface being concentric with the axis about which the clutch rotates; a reverse drum having a reverse surface adapted to be engaged by said clutch when said clutch is so expanded, said reverse surface being also concentric with the axis about which the clutch rotates; means by which said clutch can be caused to engage either said forward surface and thus drive the forward drum or the reverse surface and thus drive the reverse drum, said selective engagement being caused by a change, along said axis, of the position of said drums with relation to said clutch; means by which the forward drum drives said driven shaft in the same rotative direction as that of the engine shaft; and means by which the reverse drum drives the driven shaft in the opposite rotative direction to that of the engine shaft.

2. In a power transmission used to transmit the power of an internal combustion engine to a driven shaft and so constructed that the driven shaft may be rotated in either a forward or reverse direction without a reversal of the direction of rotation of the engine shaft, the combination of: a centrifugal clutch driven by the engine and adapted to be expanded whenever said engine rotates at a speed above a critical value; a forward drum having a forward surface adapted to be engaged by said clutch when said clutch is so expanded, said forward surface being concentric with the axis about which the clutch rotates; a reverse drum having a reverse surface adapted to be engaged by said clutch when said clutch is so expanded, said reverse surface being also concentric with the axis about which the clutch rotates; means by which said clutch can be caused to engage either said forward surface and thus drive the forward drum or the reverse surface and thus drive the reverse drum, said selective engagement being caused by a change, along said axis, of the position of said drums with relation to said clutch; a gear transmission through which the reverse drum drives the driven shaft in one direction of rotation; and a belt and pulley transmission through which the forward drum drives the driven shaft in the opposite direction of rotation.

3. In combination: an internal combustion engine; a centrifugal clutch which is operative only when the engine shaft rotates above a critical speed; means by which the clutch may be shifted when it is inoperative to either a forward or a reverse position; means by which said clutch when in its forward position causes a driven shaft to rotate in a forward direction; and means by which said clutch when in its reverse position causes said driven shaft to rotate in the opposite or reverse direction, the engine shaft at all times rotating in the same direction.

4. In combination: an internal combustion engine; a centrifugal clutch which is operative only when the engine shaft rotates above a critical speed; means by which the clutch may be shifted when it is inoperative to either a forward or a reverse position; a belt and pulley drive through which said clutch drives a driven shaft in the same rotative direction as that of the engine shaft; and a gear drive through which the clutch drives said driven shaft in the opposite rotative direction to that of the engine shaft.

5. In a mechanism of the class described, the combination of: a shaft; a forward driven element; means by which said forward driven element drives the shaft in a forward direction; a reverse driven element; means by which said reverse driven element drives the shaft in a reverse direction; a centrifugally actuated driving element which is thrown into its engaging position whenever it is rotated above a predetermined rotating speed; and means for changing the relative positions of said driving element and said driven elements so that as said driving element is thrown into its engaging position it engages one or the other of said driven elements.

6. In a mechanism of the class described, the combination of: a shaft; a forward clutch drum; means by which said forward clutch drum drives said shaft in a forward direction; a reverse clutch drum; means by which said reverse clutch drum drives said shaft in a reverse direction; a driving element adapted to be expanded by centrifugal force; and means for changing the relative positions of said driving element and said driven elements so that as said driving element expands it engages one or the other of said driven elements.

FORD W. HARRIS.

REFERENCES CITED

The following references are of record in the file of this patent:

UNITED STATES PATENTS

| Number | Name | Date |
| --- | --- | --- |
| 1,442,057 | Eggert | Jan. 16, 1923 |
| 1,493,128 | Rollag | May 6, 1924 |
| 2,185,537 | Brownlee | Jan. 2, 1940 |
| 2,299,563 | Carlson et al. | Oct. 20, 1942 |